(12) United States Patent
Itoda et al.

(10) Patent No.: US 8,244,122 B2
(45) Date of Patent: Aug. 14, 2012

(54) ELECTRONIC DEVICE

(75) Inventors: Takenori Itoda, Himeji (JP); Yasuhiro Kondo, Maebashi (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 341 days.

(21) Appl. No.: 12/537,683

(22) Filed: Aug. 7, 2009

(65) Prior Publication Data

US 2010/0035138 A1   Feb. 11, 2010

(30) Foreign Application Priority Data

Aug. 11, 2008  (JP) ................................. 2008-206612

(51) Int. Cl.
*G03B 17/02* (2006.01)
(52) U.S. Cl. ........................................ 396/539; 429/175
(58) Field of Classification Search .................. 396/536, 396/539; 429/175
See application file for complete search history.

(56) References Cited

U.S. PATENT DOCUMENTS

| 5,966,776 | A | * | 10/1999 | Ona | ................................. 16/328 |
| 6,612,668 | B2 | * | 9/2003 | Doan | ......................... 312/223.2 |
| 7,380,313 | B2 | * | 6/2008 | Akiyama et al. | ................. 16/367 |
| 7,502,561 | B2 | * | 3/2009 | Lee et al. | ....................... 396/536 |
| 2004/0214482 | A1 | * | 10/2004 | Ariga | ............................. 439/894 |
| 2008/0145735 | A1 | | 6/2008 | Ishikawa | |
| 2009/0084040 | A1 | * | 4/2009 | Kondo et al. | .................... 49/394 |

FOREIGN PATENT DOCUMENTS

| JP | 2000-130490 A | 5/2000 |
| JP | 2008-147115 A | 6/2008 |

* cited by examiner

*Primary Examiner* — W. B. Perkey
*Assistant Examiner* — Linda B Smith
(74) *Attorney, Agent, or Firm* — Westerman, Hattori, Daniels & Adrian, LLP (57) ABSTRACT

The electronic device according to the present invention comprises a body having an opening part defined therein, a cover member for opening and closing the opening part of the body, a pivotally supporting mechanism for pivotally supporting a base end part of the cover member at a position adjacent to the opening part of the body, and a cam mechanism provided to opposed parts of the body and the cover member. The cam mechanism comprises a slidable contact surface and a sliding part relatively sliding on the slidable contact surface along a predetermined cam curve as the cover member is opened and closed, and the predetermined cam curve is defined about a pivot of the pivotally supporting mechanism and so as to make the cover member move in either direction of two opposite directions along the pivot of the pivotally supporting mechanism in a process of closing the cover member.

2 Claims, 8 Drawing Sheets

ELECTRONIC DEVICE

The application Number 2008-206612, upon which this patent application is based, is hereby incorporated by reference.

BACKGROUND OF THE INVENTION

1. Field of the Invention

The present invention relates to electronic devices such as a digital camera, and particularly to an electronic device including a body to which a cover member is pivotally supported for opening and closing an opening part defined in the body.

2. Description of Related Art

An electronic device such as a digital camera conventionally has a body provided with a storage room (opening part) for storing a battery and a cover member attached to the body for opening and closing the storage room. The body consists of a chassis and a cabinet covering the chassis, and the storage room opens on a surface of the cabinet. Therefore, when an edge of the cabinet is exposed at an entrance of the storage room, it is possible that the cover member comes into contact with the edge of the cabinet in a process of closing the cover member. Particularly, in the case where the cabinet is made of metal (for example, made of aluminum), a contact of the cover member with the edge of the cabinet results in a damage of the cover member, removal of coating and the like.

Accordingly, the edge of the cabinet is conventionally covered by a resin member to prevent the damage of the cover member and removal of coating.

Along with the downsizing or thinning of the electronic device, need to omit a part of the resin member covering the edge of the cabinet has arisen. However, if a part of the resin member is omitted, the edge of the cabinet made of metal (metal edge) is exposed and the cover member comes into contact with the metal edge to result in the damage of the cover member, removal of coating and the like.

SUMMARY OF THE INVENTION

In view of above described problem, an object of the present invention is, in an electronic device in which a metal edge is exposed in an opening part to be opened and closed by a cover member, to prevent the cover member from coming into contact with the metal edge in a process of closing the cover member.

An electronic device according to a first aspect of the present invention comprises a body having an opening part defined therein, a cover member for opening and closing the opening part of the body, a pivotally supporting mechanism for pivotally supporting a base end part of the cover member at a position adjacent to the opening part of the body, and a cam mechanism is provided to opposed parts of the body and the cover member. The cam mechanism comprises a slidable contact surface and a sliding part relatively sliding on the slidable contact surface along a predetermined cam curve as the cover member is opened and closed, and the predetermined cam curve is defined about a pivot of the pivotally supporting mechanism and so as to make the cover member move in either direction of two opposite directions along the pivot of the pivotally supporting mechanism in the process of closing the cover member.

According to the electronic device of the first aspect described above, even when, due to downsizing, thinning of the electronic device or the like, the metal edge in the opening part has to be exposed, it is possible to move the cover member away from the metal edge in the process of closing the cover member.

An electronic device according to a second aspect of the present invention is the electronic device according to the first aspect wherein the opening part of the body has an entrance having a generally rectangular form with two sides extending in parallel with each other, either one side of the two sides is defined by a metal edge while the other side is defined by a resin edge, and the predetermined cam curve is defined so as to make the cover member gradually move away from the metal edge in the process of closing the cover member.

According to the electronic device of the second aspect described above, since the cover member gradually moves away from the metal edge in the process of closing the cover member, even in the case where the cover member is inclined toward the metal edge, the cover member can be closed maintaining a clearance between the metal edge and the cover member a predetermined distance or greater.

An electronic device according to a third aspect of the present invention is the electronic device according to the first or second aspect wherein the slidable contact surface is inclined with respect to a plane perpendicular to the pivot of the pivotally supporting mechanism, and the predetermined cam curve is defined so as to make the sliding part relatively move around the pivot from a higher position to a lower position on the slidable contact surface or from the lower position to the higher position on the slidable contact surface in the process of closing the cover member.

According to the electronic device of the third aspect described above, it is possible to make the sliding part or the slidable contact surface provided on the cover member move around the pivot in either direction of two opposite directions along the pivot in the process of closing the cover member. Therefore, the cover member moves around the pivot in the direction in the process of closing the cover member.

As described, according to the electronic device of the present invention, it is possible to prevent the cover member from coming into contact with the metal edge in the process of closing the cover member.

DETAILED DESCRIPTION OF THE PREFERRED EMBODIMENT

In a preferred embodiment discussed in detail below with reference to drawings, the present invention is implemented in a digital camera.

1. Structure of Digital Camera

Figure 1:
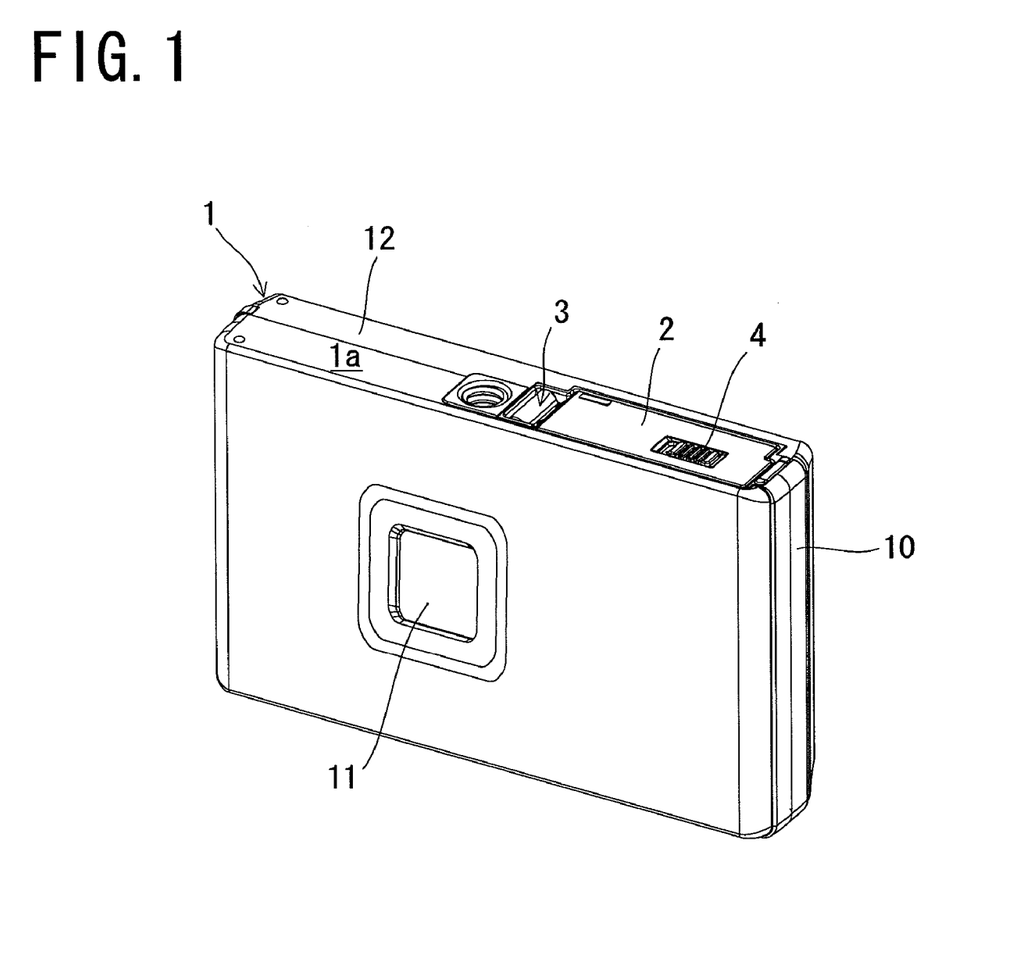
FIG. 1 is a perspective view of a digital camera according to an embodiment of the present invention taken from a bottom surface side.
Figure 2:
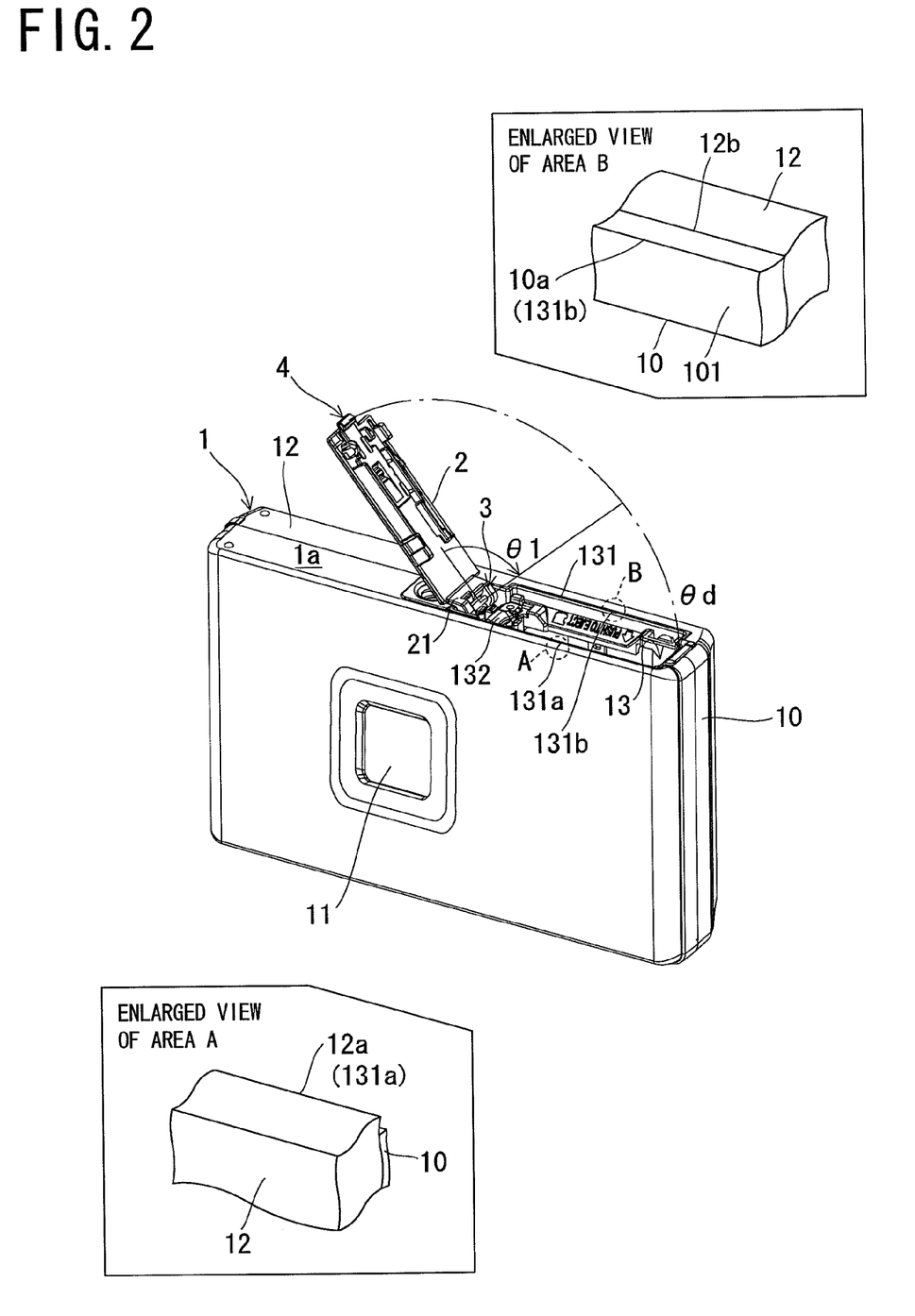
FIG. 2 is a perspective view of the digital camera with a cover member open taken from a bottom surface side.

A digital camera according to an embodiment of the present invention, as shown in FIGS. 1 and 2, comprises a body 1, a cover member 2, and a pivotally supporting mechanism 3. The body 1 comprises a chassis 10 made of resin, and a cabinet 12 made of metal covering large part of a surface of the chassis 10. The body 1 is provided with an imaging mechanism 11 including a lens and the like, and an operation part (not shown) for operating the digital camera. Also, the body 1 has a storage room 13 defined therein for storing a rechargeable battery for supplying electric power to the digital camera, a memory card for recording a taken image and the like as shown in FIG. 2. In the storage room 13, provided is a fall-off prevention mechanism 132 for preventing a stored rechargeable battery 61 from falling off.

In order that the rechargeable battery, the memory card and the like may be inserted into the storage room 13 from outside the body 1, the storage room 13 opens on a surface of the cabinet 12 defining a bottom surface 1a of the body 1 as shown in FIG. 2. In FIG. 2, an entrance of the storage room 13 is indicated by a reference symbol 131. In view of the fact that the storage room 13 has the entrance 131, the storage room 13 may be considered to be an opening part.

As shown in FIG. 2, the entrance 131 of the storage room 13 has a generally rectangular form having two long sides 131a, 131b extending in parallel with each other. One long side 131a of the two long sides 131a, 131b is defined by an edge 12a (metal edge) of the cabinet 12 made of metal, as shown in an enlarged view of an area A in FIG. 2. In other words, at the entrance 131, the edge 12a of the cabinet 12 made of metal is exposed.

The other long side 131b is defined by an edge 10a (resin edge) of the chassis 10 made of resin, as shown in an enlarged view of an area B in FIG. 2. An edge forming part 101 forming the edge 10a of the chassis 10 made of resin covers a metal edge 12b as shown in the enlarged view of the area B in FIG. 2. The metal edge 12b is an edge of the cabinet 12 opposed to the edge 12a, and the entrance 131 is disposed between the edge 12a and the metal edge 12b.

Therefore, on the entrance 131 on the long side 131b side, the cover member 2 does not come into contact with the metal edge 12b. Further, even if the cover member 2 comes into contact with the long side 131b of the entrance 131, since the long side 131b is defined by the resin edge 10a, it does not result in the damage of the cover member 2 or removal of the coating.

Figure 3:
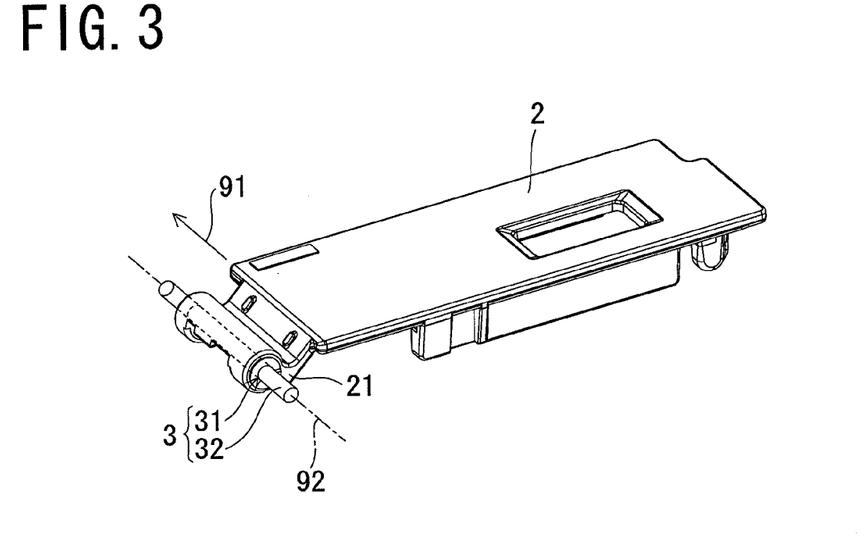
FIG. 3 is a perspective view of the cover member taken from a pivotally supporting mechanism side.

The cover member 2 is to open and close the storage room 13 as shown in FIG. 2, and a base end part 21 of the cover member 2 is pivotally supported by the pivotally supporting mechanism 3 at a position adjacent to the storage room 13. The pivotally supporting mechanism 3 consists of a through-hole 31 defined in the base end part 21 of the cover member 2, and a shaft 32 as shown in FIG. 3. The through-hole 31 passes through the base end part 21 of the cover member 2 in a lateral direction 91 of the cover member 2. The shaft 32 passes through the through-hole 31, and is attached to the body 1 at the position adjacent to the storage room 13 as shown in FIG. 2.

The cover member 2 is thereby capable to rotate around the shaft 32, and is rotatable between an open position where the cover member 2 may be kept open and a closed position where it closes the storage room 13. In FIG. 2, an angle by which the cover member 2 rotates from the open position (rotation angle) is indicated by a reference symbol $\theta1$, and the rotation angle by which the cover member 2 rotates from the open position to the closed position is indicated by the reference symbol $\theta d$.

In order to prevent the cover member 2 from opening despite the intention of the user, the cover member 2 is provided with a lock mechanism 4 for locking the cover member 2 at the closed position (FIG. 1) where the storage room 13 is closed by the cover member 2 as shown in FIGS. 1 and 2.

Figure 4:
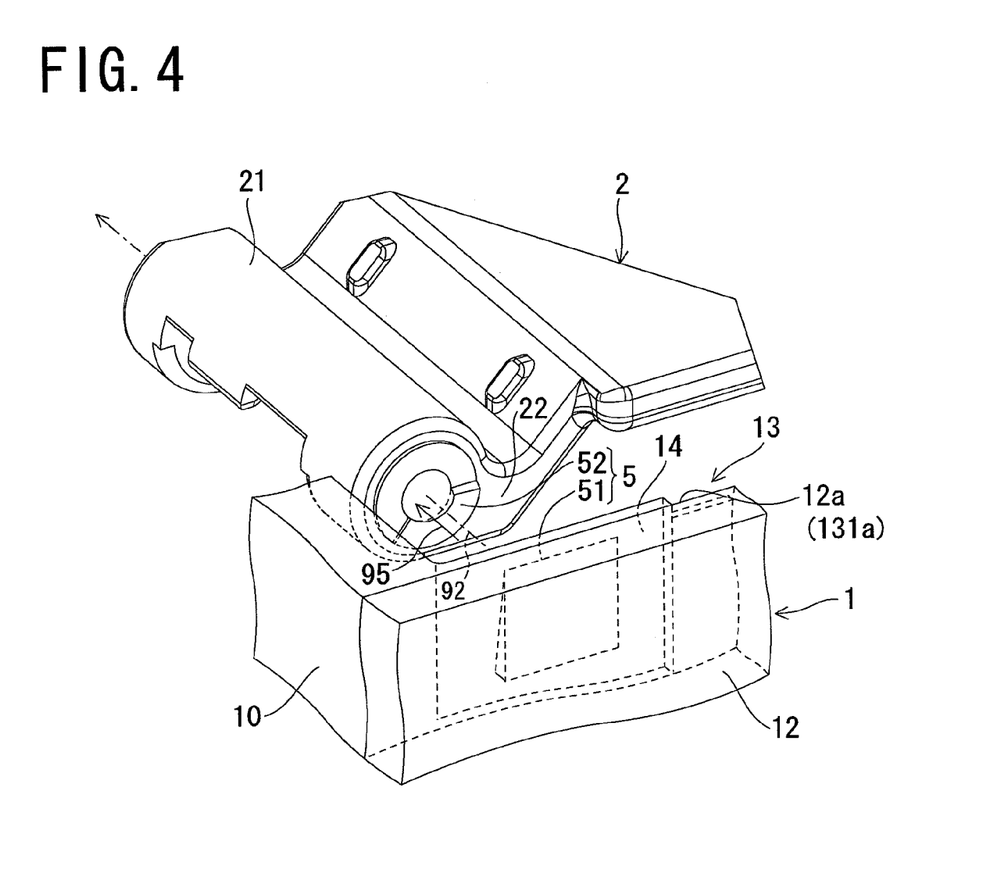
FIG. 4 is an enlarged perspective view of a main part (a cam mechanism) of the digital camera.

In the digital camera described above, a cam mechanism 5 is provided to opposing parts 14, 22 of the body 1 and the base end part 21 of the cover member 2, as shown in FIG. 4, at a position on the side of the long side 131a defined by the metal edge 12a. The cam mechanism 5 consists of a slidable contact surface 51 defined on the opposing part 14 and a sliding part 52 provided on the opposing part 22 and sliding on the slidable contact surface 51. In FIG. 4, in order to show a structure of the cam mechanism 5 clearly, the opposing parts 14, 22 are shown apart from each other along a pivot 92 of the pivotally supporting mechanism 3.

Figure 5:
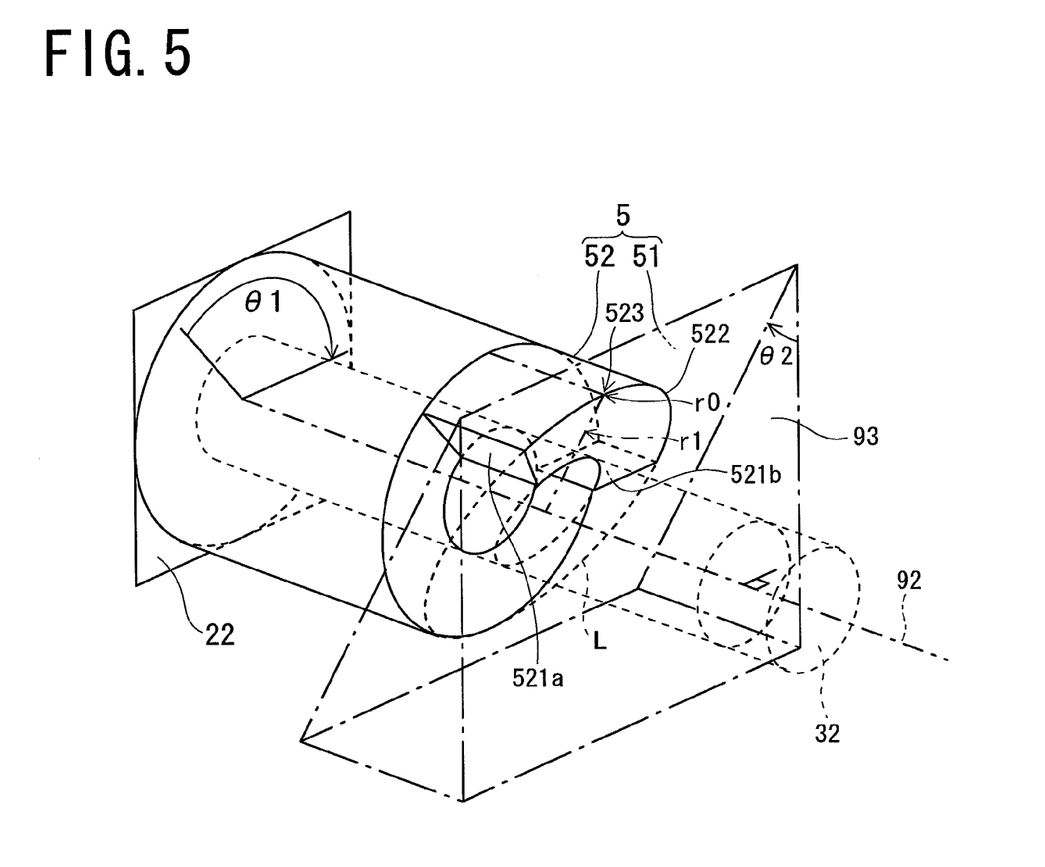
FIG. 5 is a perspective view explaining a structure of the cam mechanism.
Figure 6:
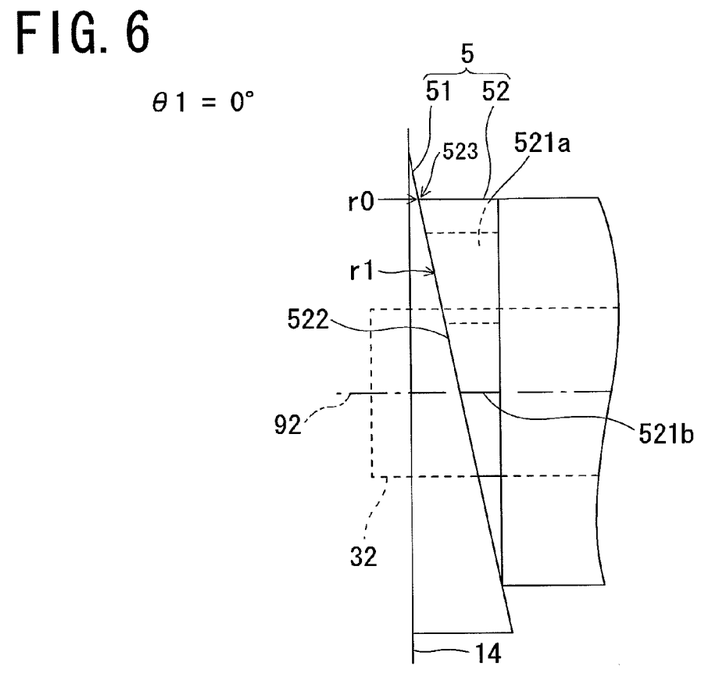
FIG. 6 is a view showing the cam mechanism in a first operating state taken from a storage room side.

In particular, as shown in FIG. 5, the slidable contact surface 51 is flat and inclined at an angle $\theta2$ with respect to a plane 93 perpendicular to the pivot 92 of the pivotally supporting mechanism 3. As shown in FIG. 5, the sliding part 52 is formed in an arc shape about the pivot 92 of the pivotally supporting mechanism 3 around the shaft 32. More specifically, as shown in FIG. 5, the sliding part 52 at the open position extends around the pivot 92 in an arc shape from a lower position to a higher position on the slidable contact surface 51 with respect to the plane 93 over a position r1. The position r1 is such that the slope of a line extending from an intersection point of the pivot 92 and the slidable contact surface 51 to the position r1 is the steepest. Also, as shown in FIG. 6, the sliding part 52 at the closed position is in surface contact with the slidable contact surface 51. In FIGS. 5 to 8, both end faces of the sliding part 52 around the pivot 92 are indicated by reference symbols 521a, 521b.

Operation of the cam mechanism 5 is explained below with reference to FIGS. 6 to 8. First, when the cover member 2 starts closing from the open position, the sliding part 52 slightly moves around the pivot 92, whereby the sliding part 52 shifts from a state of being in surface contact with the slidable contact surface 51 (FIG. 6) to a state where an outer frame 522 of the sliding part 52 is in abutment with the slidable contact surface 51 (see FIG. 7). At this point, a tip portion 523 of the sliding part 52 is in a state of being apart from the slidable contact surface 51 in a direction along the pivot 92.

Figure 7:
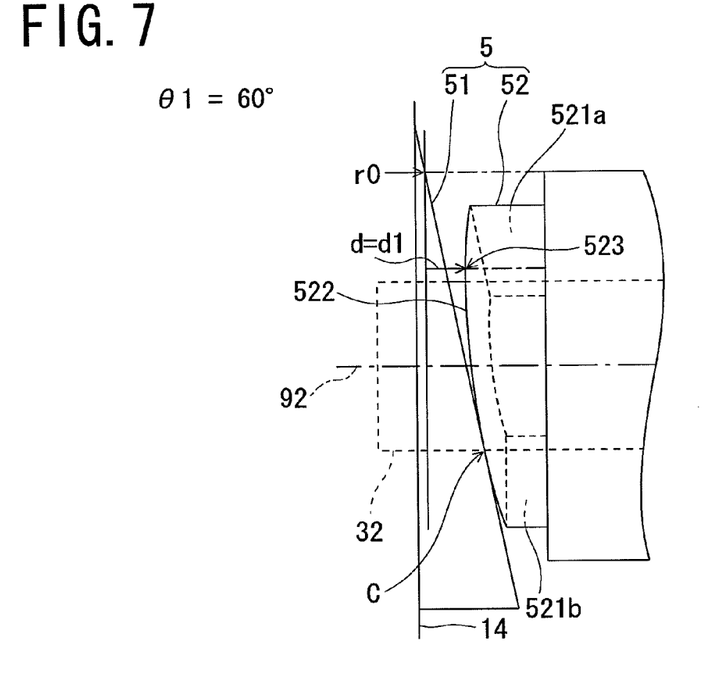
FIG. 7 is a view showing the cam mechanism in a second operating state taken from the storage room side.
Figure 8:
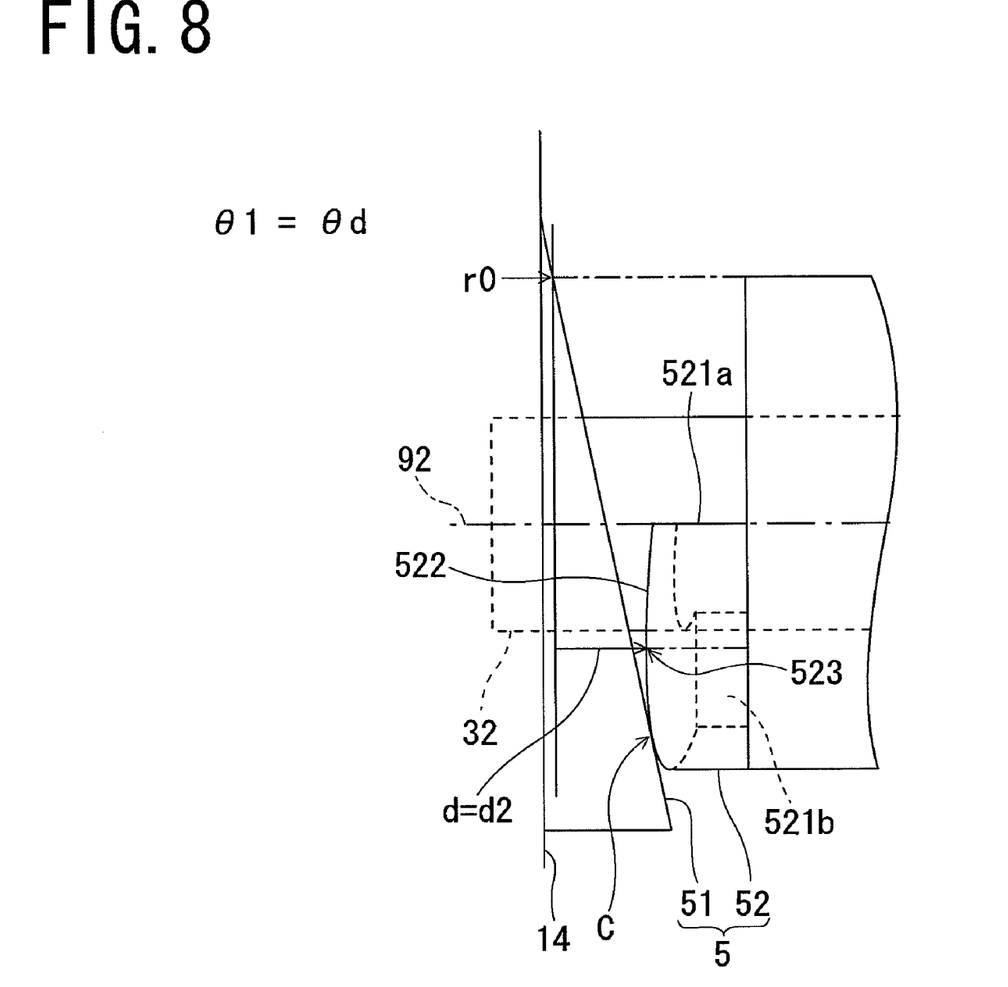
FIG. 8 is a view showing the cam mechanism in a third operating state taken from the storage room side.

Then, when the cover member 2 is being closed, as shown in FIGS. 7 and 8, the sliding part 52 slides on the slidable contact surface 51, while an abutment position C of the outer frame 522 of the sliding part 52 with the slidable contact surface 51 move around the pivot 92 along an orbit L shown in FIG. 5 toward the higher position on the slidable contact surface 51. Along with this, the tip portion 523 of the sliding part 52 moves around the pivot 92 toward the higher position on the slidable contact surface 51, maintaining the state of being apart from the slidable contact surface 51 in the direction along the pivot 92.

The tip portion 523 of the sliding part 52 thereby moves by a distance d from a position r0 on the slidable contact surface 51 at the time the cover member 2 disposed at the closed position in a direction (departure direction) 95 of moving away from the opposing part 14 of the body 1 along the pivot 92. In other words, in the process of closing the cover member 2, the cover member 2 moves by the distance d in the departure direction 95 along the pivot 92. The distance d is hereinafter referred to as movement distance.

FIG. 7 shows the cam mechanism 5 with the rotation angle θ1 of the cover member 2 being 60 degrees, and the movement distance d here is indicated by a reference symbol d1. Also, FIG. 8 shows the cam mechanism 5 with the rotation angle θ1 of the cover member 2 being θd (FIG. 2), and the movement distance d here is indicated by a reference symbol d2.

Figure 9:
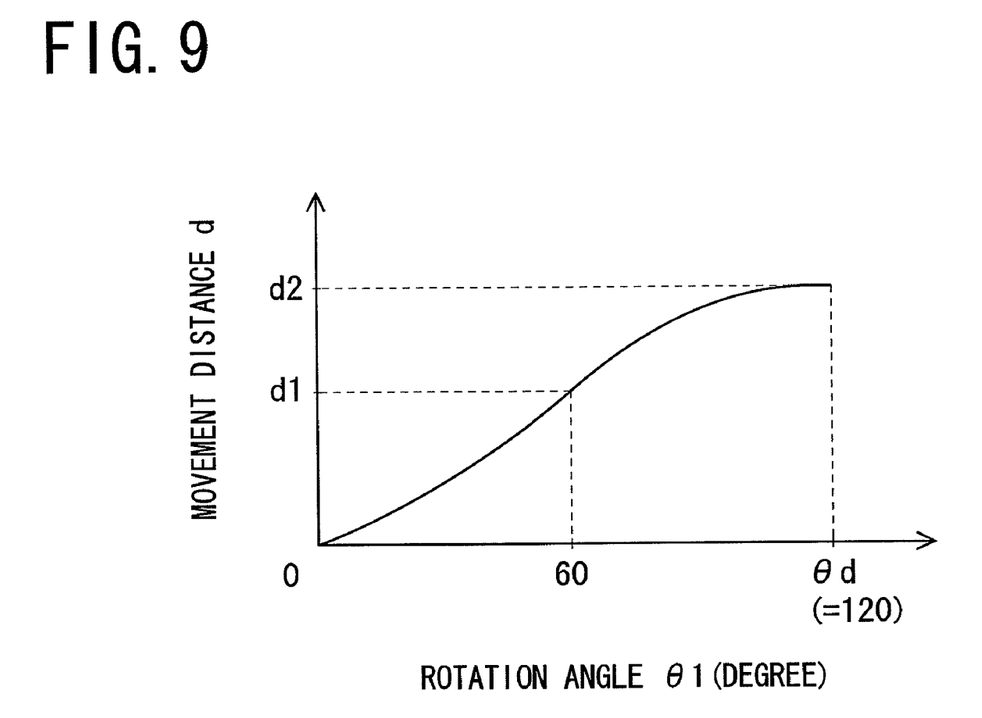
FIG. 9 is a view showing a cam curve of the cam mechanism.

The relation of the rotation angle θ1 of the cover member 2 and the movement distance d may be described by the cam curve, as shown in FIG. 9. In the cam curve, an output displacement (movement distance d) obtained from the cam mechanism 5 is described by a function of input parameter (rotation angle θ1). The cam curve shown in FIG. 9 is defined in the case where the slidable contact surface 51 is a flat slope and the rotation angle θd is 120 degrees.

Figure 10:
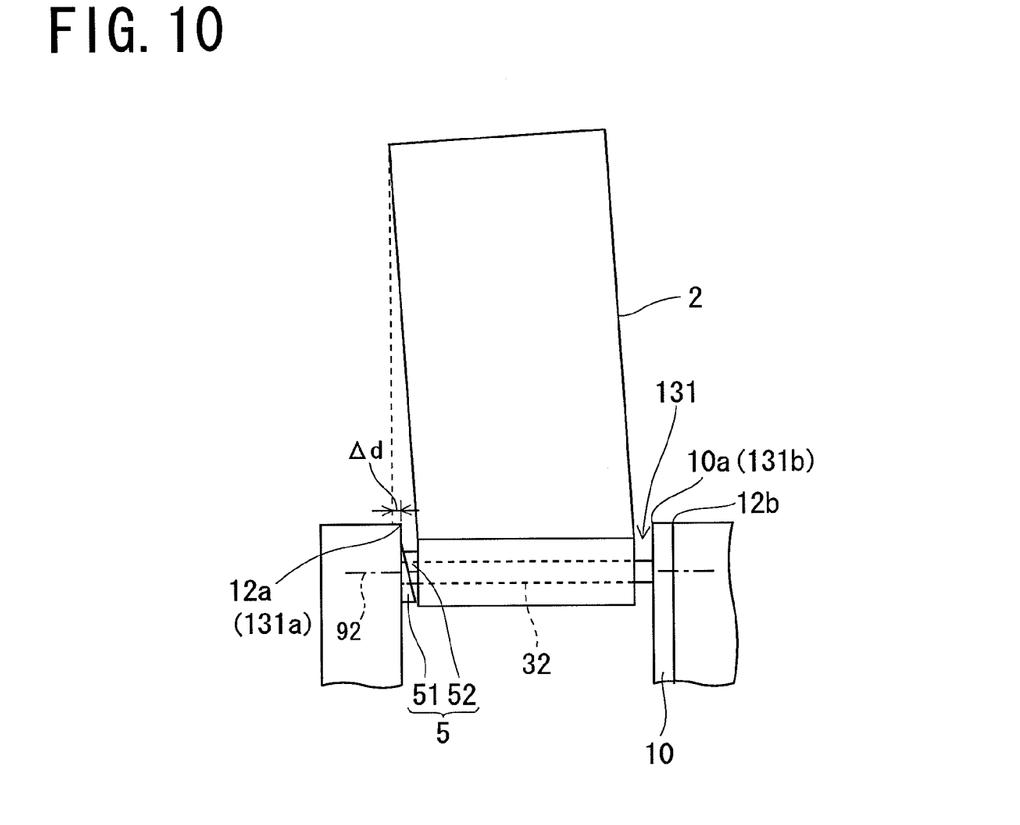
FIG. 10 is a view of a cover member at an open position taken from the storage room side.
Figure 11:
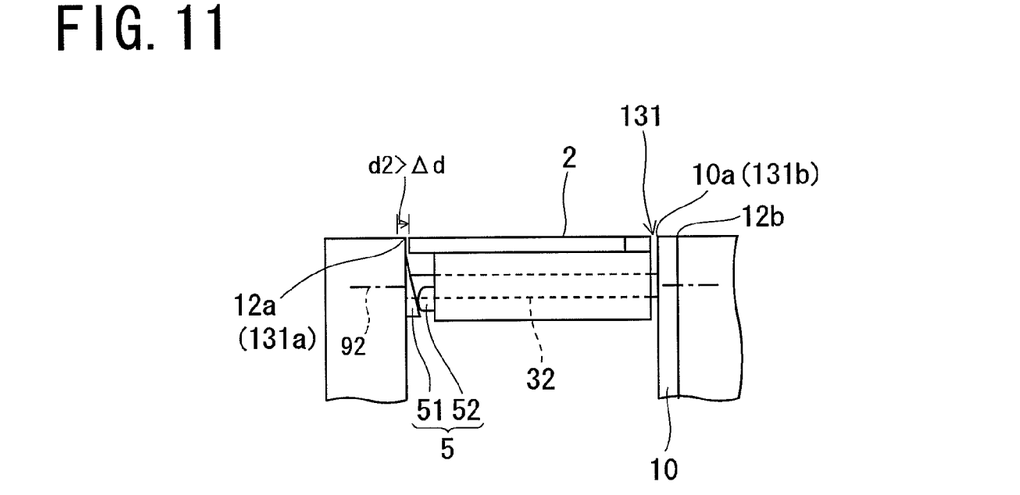
FIG. 11 is a view of a cover member at a closed position taken from the storage room side.

According to the cam mechanism 5 described above, in the process of closing the cover member 2, the cover member 2 gradually moves away from the metal edge 12a. Therefore, even in the case where the cover member 2 is inclined toward the long side 131a defined by the metal edge 12a and there is an overlapped part having a width Δd of the cover member 2 and the body 1 as shown in FIG. 10, the cover member 2 can be closed maintaining a clearance between the metal edge 12a and the cover member 2 a predetermined distance or greater in the process of closing the cover member 2, by making a value d2 of the movement distance d have the width Δd or greater at the closed position (FIG. 8). As a result, in the process of closing the cover member 2, the cover member 2 does not come into contact with the metal edge 12a, and after having moved to the closed position, the cover member 2 fits in the entrance 131 as shown in FIG. 11.

In view of the fact that the relation of the rotation angle θ1 and the movement distance d is described by the cam curve in the cam mechanism 5, the cam mechanism 5 may be considered as follows. In the cam mechanism 5, the sliding part 52 slides along a predetermined cam curve on the slidable contact surface 51 as the cover member 2 is opened and closed. The predetermined cam curve is defined with the pivot 92 of the pivotally supporting mechanism 3 being the center thereof, and defined so as to make the cover member 2 move in the departure direction 95 along the pivot 92 of the pivotally supporting mechanism 3 in the process of closing the cover member 2.

Also, in view of the fact that the cover member 2 gradually moves away from the metal edge 12a in the process of closing the cover member 2, the predetermined cam curve may be considered to be defined so as to make the cover member 2 gradually move away from the metal edge 12a in the process of closing the cover member 2.

Further, in view of the fact that the tip portion 523 of the sliding part 52 moves around the pivot 92 from the lower position r1 to the higher position on the slidable contact surface 51 in the process of closing the cover member 2, the predetermined cam curve may be considered to be defined so as to make the sliding part 52 relatively move around the pivot 92 from the lower position r1 to the higher position on the slidable contact surface 51 in the process of closing the cover member 2.

According to the digital camera described above, even when, due to downsizing, thinning of the electronic device or the like, the metal edge 12a in the storage room 13 has to be exposed, it is possible to move the cover member 2 away from the metal edge 12a in the process of closing the cover member 2. Therefore, it is possible to prevent the cover member 2 from coming into contact with the metal edge 12a in the process of closing the cover member 2, thereby preventing damage of the cover member 2 or removal of the coating due to the contact.

2. Modifications 2-1. Modification 1

In the digital camera described above, the slidable contact surface 51 is defined on the body 1, and the sliding part 52 is provided on the cover member 2. However, it is also possible to provide the sliding part 52 on the body 1 and define the slidable contact surface 51 on the cover member 2.

According to this modification, the slidable contact surface 51 moves around the pivot 92 of the pivotally supporting mechanism 3 as the cover member 2 is opened and closed, and the sliding part 52 provided on the body 1 thereby relatively slides on the slidable contact surface 51. Thereby the slidable contact surface 51 defined on the cover member 2 moves in the departure direction 95 (FIG. 4) along the pivot 92 of the pivotally supporting mechanism 3. Therefore, in the embodiment according to this modification, it is possible to gradually move the cover member 2 away from the metal edge 12a in a similar manner to the embodiment described above.

2-2. Modification 2

In the digital camera described above, the cam mechanism 5 is provided at the position on the side of the long side 131a defined by the metal edge 12a. However, it is also possible to provide the cam mechanism 5 at a position on the side of the long side 131b defined by the resin edge 10a.

In such a case, the predetermined cam curve is defined so as to make the sliding part 52 move around the pivot 92 from the higher position to the lower position on the slidable contact surface 51 in the process of closing the cover member 2. Therefore, in the embodiment according to this modification, it is possible to gradually move the cover member 2 away from the metal edge 12a in a similar manner to the embodiment described above.

2-3. Modification 3

In the digital camera described above, as shown in FIG. 5, the slidable contact surface 51 consists of the flat slope inclined at the angle of θ2 with respect to the plane 93 perpendicular to the pivot 92 of the pivotally supporting mechanism 3 (FIG. 5), and the sliding part 52 has a shape such that the sliding part 52 is in surface contact with the slidable contact surface 51 at the closed position. However, the shapes of the slidable contact surface 51 and the sliding part 52 are not limited to these. As long as the cover member 2 can move in the departure direction 95 (FIG. 4) along the pivot 92 of the pivotally supporting mechanism 3 in the process of closing the cover member 2, it is possible to adopt a variety of shapes for the shapes of the slidable contact surface 51 and the sliding part 52.

The structure of each part of the present invention is not limited to the above embodiment, and various modifications may be made within the technical scope set forth in the claims. For example, the art described above may be adopted not only in digital cameras, but also in various electronic devices such as a video camera, a portable phone and the like.

What is claimed is:

1. An electronic device comprising:
a body having an opening part defined therein,
a cover member which opens and closes the opening part of the body, a pivotally supporting mechanism which pivotally supports a base end part of the cover member at a position adjacent to the opening part of the body, and a cam mechanism provided to opposed parts of the body and the cover member, wherein the cam mechanism comprises a slidable contact surface which maintains a fixed relative position to the body and sliding part which maintains a fixed relative position to the cover member and relatively slides on the slidable contact surface along a predetermined cam curve as the cover member is opened and closed, and the predetermined cam curve is defined about a pivot of the pivotally supporting mechanism and so as to make the cover member move in either direction of two opposite directions along the pivot of the pivotally supporting mechanism in a process of closing the cover member, the opening part of the body has an entrance having a generally rectangular form with two sides extending in parallel with each other, either one side of the two sides is defined by a metal edge while the other side is defined by a resin edge, and the predetermined cam curve is defined so as to make the cover member gradually move away from the metal edge in the process of closing the cover member.

2. The electronic device according to claim 1, wherein the slidable contact surface is inclined with respect to a plane perpendicular to the pivot of the pivotally supporting mechanism, and the predetermined cam curve is defined so as to make the sliding part relatively move around the pivot from a higher position to a lower position on the slidable contact surface or from the lower position to the higher position on the slidable contact surface in the process of closing the cover member.

* * * * *